United States Patent [19]

Dorow et al.

[11] Patent Number: 5,779,271
[45] Date of Patent: Jul. 14, 1998

[54] ENERGY ABSORPTION DEVICE FOR IMPACTS IMPARTED TO A SUPPORT BAR OF A VEHICLE

[75] Inventors: Duane A. Dorow; Sukhbir S. Bilkhu, both of Rochester Hills, Mich.

[73] Assignee: Chrysler Corporation, Auburn Hills, Mich.

[21] Appl. No.: 664,944

[22] Filed: Jun. 17, 1996

[51] Int. Cl.$^6$ ............................................. B60R 21/13
[52] U.S. Cl. ........................... 280/751; 280/756; 296/189
[58] Field of Search .......................... 280/751, 756, 280/784; 296/188, 189, 210

[56] References Cited

U.S. PATENT DOCUMENTS

| | | |
|---|---|---|
| 3,181,849 | 5/1965 | Mitchell . |
| 3,219,384 | 11/1965 | Graham ................................ 296/188 |
| 3,810,656 | 5/1974 | Fox et al. ............................ 280/751 |
| 3,843,182 | 10/1974 | Walls et al. . |
| 3,871,636 | 3/1975 | Boyle . |
| 3,938,841 | 2/1976 | Glance et al. . |
| 4,050,726 | 9/1977 | Hablitzel . |
| 4,073,528 | 2/1978 | Klie . |
| 4,925,224 | 5/1990 | Smiszek . |
| 4,951,986 | 8/1990 | Hanafusa et al. . |
| 5,178,927 | 1/1993 | Turner .................................... 428/71 |
| 5,306,068 | 4/1994 | Nakae et al. ....................... 296/189 |
| 5,340,178 | 8/1994 | Stewart et al. . |
| 5,382,051 | 1/1995 | Glance . |
| 5,609,385 | 3/1997 | Daniel et al. ....................... 280/751 |
| 5,641,195 | 6/1997 | Patel et al. ......................... 280/751 |

FOREIGN PATENT DOCUMENTS

| | | | |
|---|---|---|---|
| 29549 | 2/1987 | Japan ............................ 280/751 |
| 60470 | 3/1989 | Japan ............................ 280/751 |

Primary Examiner—Thomas J. Brahan
Attorney, Agent, or Firm—Roland A. Fuller, III

[57] ABSTRACT

The present invention provides an energy absorption device for cushioning dynamic impacts imparted against a support bar of a vehicle by an occupant. The energy absorption device has an elongated arched impact shell having an impact side, and a member engagement side opposite the impact side. Also provided are a plurality of longitudinally spaced arched ribs that each has a first edge that is wholly attached to the member engagement side of the elongated arched impact shell and a second edge that is spaced from the first edge. The second edge abuts against the support bar of the vehicle. A plurality of impact can be stacked one upon another to increase energy absorption and decrease acceleration upon impact.

11 Claims, 2 Drawing Sheets

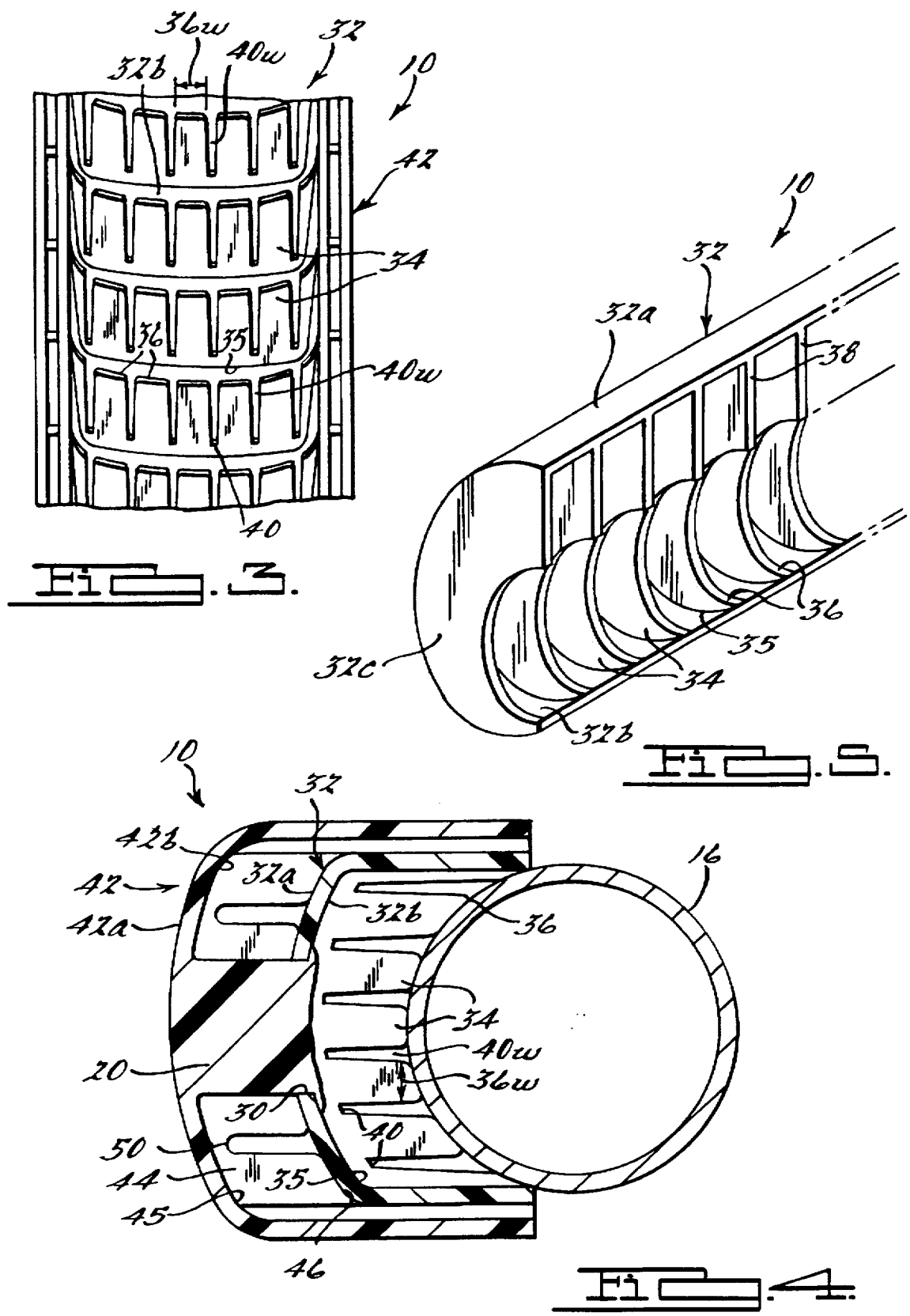

ENERGY ABSORPTION DEVICE FOR IMPACTS IMPARTED TO A SUPPORT BAR OF A VEHICLE

BACKGROUND OF THE INVENTION

1. Field of the Invention

In general, the present invention relates to impact devices. More particularly, the present invention relates to an energy absorption device for cushioning impacts imparted to a support bar by occupants sitting in the rear of a vehicle.

2. Description of the Related Art

Support bars (or roll-bars) are commonly found in sport utility model vehicles. These bars are mounted transversely within the vehicle directly behind the area of front seat occupancy. The support bars are frequently shielded to provide cushioning upon impact by occupants sitting in the rear of the vehicle. Previously, foam padding or a functionally equivalent material has been used to provide energy absorption around these support bars. Large padding around these members is unattractive, costly, and takes up precious overhead compartment space.

Straight ribs or slats have been used in vehicle bumpers to aid in energy absorption upon impact of an object. For example, U.S. Pat. No. 3,871,636 to Boyle discloses rectangularly shaped ribs that are used to aid in energy absorption. The rectangularly shaped ribs are attached or integrally formed at a short side to a rigid member. The opposing short side of the straight ribs is spaced from or abuts against a base member. Since the ribs extend longitudinally in relation to the vehicle, they only provide small amounts of energy absorption when an impact occurs that is not directly in the longitudinal direction but rather on an angle. If the impact is at a side angle with respect to the straight ribs, or displaced vertically, energy absorption from the load impact will be greatly diminished. In addition, this type of energy absorption device does not function well when the base member has a curved surface since the ribs are straight and do not conform to the curved surface. In addition, since only a short side of the rectangularly shaped ribs is attached to the impact region (the rigid member) a minimal amount of strength is provided to stabilize the ribs—energy absorption is thereby limited.

It would be advantageous to have an energy absorption device for a support bar of a vehicle with arcuate impact ribs that can be impacted in the longitudinal direction or angularly and result in energy absorption. It would also be advantageous to have one of the longest sides of each rib to be wholly attached to the impact region so that maximum rib stabilization is provided upon an impact load and thereby resulting in maximum energy absorption by each rib. Moreover, it would be advantageous to have an energy absorption device wherein the acceleration upon impact and energy absorption can be readily controlled given the amount, spacing, and thickness of the impact ribs.

SUMMARY OF THE INVENTION

The present invention provides an energy absorption device for shielding a vehicle support bar so that energy absorption and acceleration is slowed upon impact of the support bar by an occupant. The support bar is at least partially encased by an energy absorption device having an elongated arched impact shell with an impact side, and a member engagement side opposite the impact side. Also provided are a plurality of longitudinally spaced arched ribs that each have an arcuate member side that is wholly attached to the member engagement side of the impact shell. Further provided on each rib is an arcuate support bar side that is spaced from the arcuate member side. The arcuate support bar side of each rib is adjacent to the support bar or, in the preferred embodiment, adjacent to an impact side of another impact shell. Screws or bolts are inserted through the impact shell and into the bar to secure the arched impact shell in relation to the support bar of the vehicle. Acceleration upon impact and energy absorption of each shell can be readily controlled to desired levels by stacking the shells, adjusting the lateral spacing and the thickness of the ribs, or providing lateral slits in each shell.

Other objects, features and advantages of the present invention will become apparent by reference to the following detailed description when considered in conjunction with the accompanying drawings.

BRIEF DESCRIPTION OF THE DRAWINGS

FIG. 3 is a perspective view of an inner side of an arched impact shell showing a plurality of arched impact ribs having slits disposed therein of the energy absorption device of the present invention.

FIG. 4 is a cross-sectional view of the energy absorption device of the present invention showing two stacked impact shells.

FIG. 5 is an alternate embodiment of an energy impact shell of the present invention.

DESCRIPTION OF THE PREFERRED EMBODIMENT(S)

Figure 1:
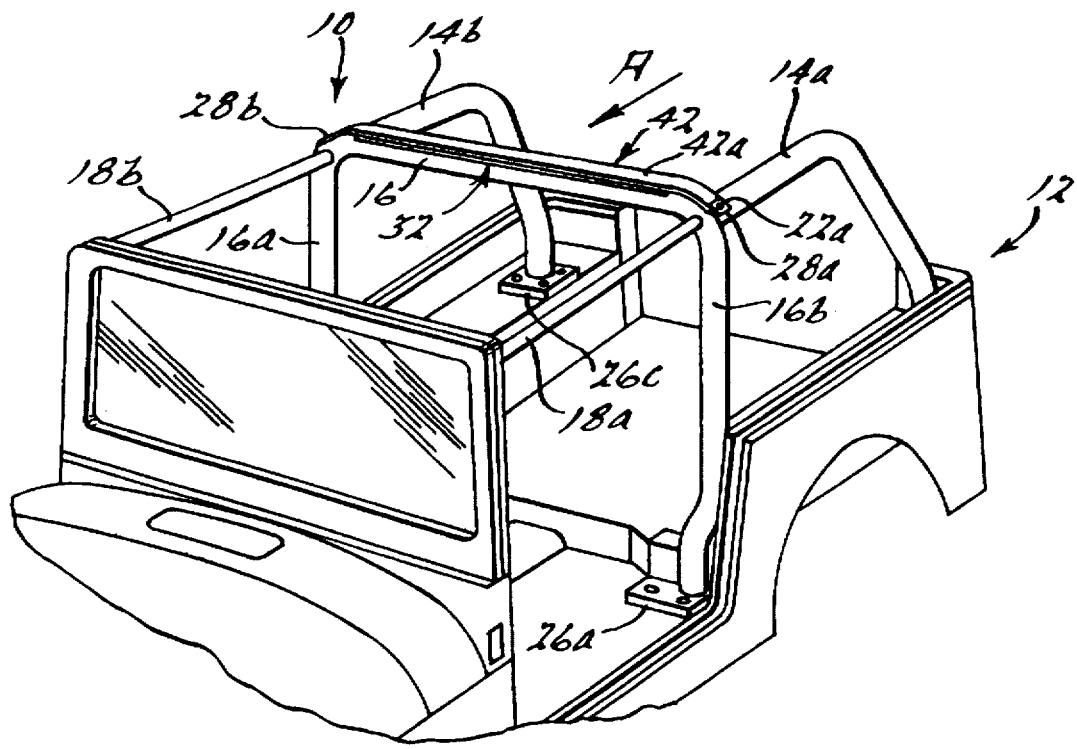
FIG. 1 is a perspective view of a vehicle showing an energy absorption device for shielding a support bar upon impact by an occupant of the present invention.
Figure 2:
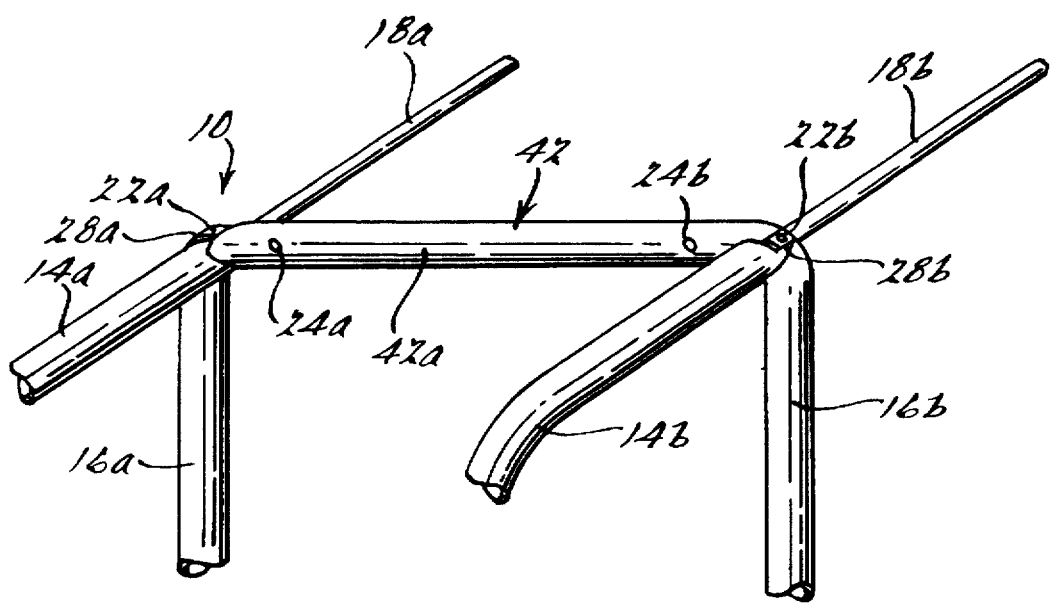
FIG. 2 is a perspective view of the energy absorption device of the present invention viewed in the direction of arrow A of FIG. 1.

Commencing with FIG. 1, an energy absorption device 10 for shielding a support bar 16 upon impact by an occupant of a vehicle 12 is shown. Longitudinal stabilization bars 14a, 14b are attached to opposite curved portions 16a, 16b of support bar 16. Support members 18a, 18b are attached to support bar 16 and extend longitudinally opposite from stabilization bars 14a, 14b. As shown in FIGS. 1 and 2, the energy absorption device 10 is attached to the vehicle 12 via attachment members such as screws or bolts 22a, 22b, which are inserted through apertures (not shown) disposed in tabs 28a, 28b of an elongated arched impact shell 42 of the energy absorption device 10, and into stabilization bars 14a, 14b. Further securing the impact shell 42 of the energy absorption device 10 to the vehicle 12 are attachement members such as screws or bolts 24a, 24b that are inserted through mounting appertures (not shown) disposed in impact shell 42 and into support bar 16. These attachment members 24a, 24b and mounting apertures provide for means attaching said plurality of elongated impact shells 32,42 to the support bar 16 of vehicle 12.

As shown in FIGS. 1, 2, and 4 the impact shell 42 has an outer impact side 42a for receiving impacts in the form of loads imparted to the shell 42 via occupants of the vehicle 12. Shown in FIG. 4, the impact shell 42 also has an inner member engagement side 42b that is disposed opposite the impact side 42a. The impact shell 42 may abut directly against the support bar 16 or, in the preferred embodiment, can abut against at least one other impact shell in a nested or stacked arrangement as shown in FIG. 5 such as against the outer impact side 32a of a second impact shell 32 that in turn is adjacent to the support bar 16.

To aid in energy absorption and cushioning upon impact of shell 42, a plurality of longitudinally spaced ribs 44 are attached thereto, which is also shown in FIG. 4. The ribs 44 each have a first edge 45 that, in the preferred embodiment, is wholly attached to or integrally formed with the member engagement side 42b of the impact shell 42. Moreover, a second edge 46 is a free edge provided on each of the ribs 44, the second edge 46 is spaced apart from the first edge 45 as best shown in FIG. 3. In the preferred embodiment, the second edge 46 of ribs 44 abut against an impact side 32a of impact shell 32.

As show in FIG. 4, the second elongated arched impact shell 32 has an impact side 32a, and a member engagement side 32b opposite the impact side 32a. Similar to the first impact shell 42, a plurality of longitudinally spaced arched ribs 34 are attached to the shell 32. Each of the ribs 34 has a first edge 35 that is wholly attached to the member engagement side 32b of the second impact shell 32. The impact side 32a is spaced from the arcuate member engagement side 32b. The ribs 44 of the first impact shell 42 abut against the impact side 32a of the second impact shell 32. As additional impact shells are used and stacked one upon another, latent energy will be transferred to the next impact shell along the direction of impact. Upon impact of the first impact shell 42 energy is imparted to the ribs 44 and energy is absorbed as the ribs 44 bend, collapse, break, and fracture. Latent energy is then transferred to the second impact shell 32 and is imparted to the ribs 34, which also disperse the load later ally and longitudinally as the ribs 14 bend, collapse, break, and fracture.

The lateral spacing between the ribs can result in the controlled collapsing of the ribs and energy absorption. Shown in FIG. 3 is a plurality of the longitudinally spaced ribs 34 of impact shell 32 that are projecting along the line of impact. Each rib 34 of impact shell 32 includes a second edge 36 of the ribs 34 abuts against support bar 16 of the vehicle 12. Further in the preferred embodiment, the ribs 44 and 34 each have a plurality of longitudinal slots 50 and 40 respectively that extend partially therethrough. As best shown in FIG. 3, the lateral width of the slots 40w is substantially smaller than the lateral width of the second edge portions 36w or the second edge 36. The slots 50 and 40 allow for greater longitudinal bending, and thus energy absorption, upon impact of the shells 42, 32 by an occupant of vehicle 12.

Means are provided with the first impact shell 42 whereby a plurality of impact shell can be stacked together as is best shown in FIG. 4. In the preferred embodiment, the means for stacking a plurality of impact shells comprises at least one heat stake 20 that is attached to, and protrudes from, the first impact shell 42 and extends through a slit 30 disposed in the second impact shell 32. The slit 30 extends through the impact side 32a and the arcuate member engagement side 32b of shell 32. During the assembly process, once the heat stake 20 is inserted through the slit 30, the heat stake 20 is heated to such a degree that the material of the stake 20 is melted thereby securely fastening the first impact shell 42 to the second shell 32. Similarly, the same if a plurality of shells are stacked, the heat stake will extend through slits in all shells apart from the first shell where the heat stake protrudes therefrom.

Shown in FIG. 5 is an alternate embodiment of the configuration of impact ribs 34. Further, the lateral spacing of the ribs 34 has been increased to thereby decrease rigidity of the impact shell 32. Moreover, longitudinally opposed termination ends 32c are fixedly attached at each end of the shell 32. In operation, when a load is applied to the impact side 42a of shell 42, it is transferred inward toward the ribs 44, which are attached or integrally formed to the member engagement side 42b of the shell 42 at the arcuate member side 45. Once the impact load is transferred to the ribs 44 they bend, collapse, break, and fracture thereby absorbing energy. In the present invention, the load transfer can be controlled to decrease acceleration and increase cushioning of the energy absorption device 10 upon impact by an occupant.

While the invention has been described in detail, it is to be expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

What is claimed is:

1. An energy absorption device for cushioning impacts imparted against a support bar of a vehicle by an occupant, the energy absorption device comprising:

a plurality of elongated impact shells provided in a nested arrangement adjacent to said support bar;

a plurality of ribs extending from at least one of said plurality of impact shells, said plurality of ribs having a first edge attached to said impact shell from which they extend and a free second edge; and an attachment element adapted to couple said plurality of elongated impact shells and said support bar.

2. The invention according to claim 1, wherein said plurality of ribs are cantilevered from said impact shell from which they extend.

3. The invention according to claim 1, further comprising a heat stake projecting from at least one of said plurality of impact shells adapted for attachment to another of said plurality of impact shells.

4. The invention according to claim 1, wherein each of said plurality of impact shells includes at least one mounting aperture adapted to accommodate said attachment element, said attachment element is comprised of at least one screw.

5. The invention according to claim 1, wherein at least one of said plurality of ribs includes at least one slot, said at least one slot having a lateral width substantially smaller than the lateral width of a second edge portion of said second edge of said rib.

6. The invention according to claim 1, wherein said second edge of each of said plurality of ribs is disposed adjacent to either said support bar or one of said plurality of impact shells.

7. An energy absorption device for cushioning impacts imparted against a support bar of a vehicle by an occupant, the energy absorption device comprising:

an elongated impact shell;

a plurality of ribs extending from said impact shell, said plurality of ribs having a first edge attached to said impact shell and a free second edge;

at least one of said plurality of ribs extending from said impact shell including at least one slot therein, said at least one slot having a lateral width substantially smaller than the lateral width of a second edge portion of said second edge of said rib; and an attachment element adapted to couple said elongated impact shell and said support bar.

8. The invention according to claim 7, wherein said plurality of ribs are cantilevered, from said impact shell from which they extend.

9. The invention according to claim 7, wherein said impact shell includes at least one mounting aperture adapted to accommodate said attachment element, said attachment element is comprised of at least one screw.

10. An energy absorption device for cushioning impacts imparted against a support bar of a vehicle by an occupant, the energy absorption device comprising:

a plurality of elongated impact shells provided in a nested arrangement adjacent to said support bar;

a plurality of ribs extending from each of said plurality of impact shells, said plurality of ribs having a first edge attached to said impact shell from which they extend and a free second edge, said second edge being disposed adjacent to either said support bar or another one of said plurality of elongated impact shells;

a heat stake projecting from at least one of said plurality of impact shells adapted for attachment to another of said plurality of impact shells;

at least one of said plurality of ribs includes a plurality of slots, said plurality of slots having a lateral width substantially smaller than the lateral width of a second edge portion of said second edge of said rib; and attachment element adapted to couple said plurality of elongated impact shells and said support bar.

11. The invention according to claim 10, wherein said plurality impact shells includes at least one mounting aperture adapted to accommodate said attachment element, said attachment element comprises at least one screw.

* * * * *